Patented Feb. 12, 1946

2,394,772

UNITED STATES PATENT OFFICE 2,394,772

SHRINKING CELLULOSE DERIVATIVE TEXTILE MATERIAL

Frank Brentnall Hill, Spondon, near Derby, England, assignor to British Celanese Limited, London, England, a company of Great Britain No Drawing. Application July 8, 1944, Serial No. 544,143. In Great Britain April 15, 1943

7 Claims. (Cl. 8—132)

This application relates to the treatment of textile materials and in particular to a process for shrinking textile materials having a basis of an organic derivative of cellulose.

In U. S. Patent No. 2,070,583 there is described a process for shrinking cellulose derivative textile materials in which the active shrinking agent is a latent solvent for the cellulose derivative, i. e. a compound which is capable of swelling the cellulose derivative to a high degree and which, while not itself a solvent for the cellulose derivative, forms with certain other compounds which also are not solvents for the cellulose derivative, particularly alcohols, mixtures which are capable of dissolving the cellulose derivative. Among these latent solvents it is shown that methylene chloride is of particular value and importance.

It is of course essential if the cellulose derivative material is not to be considerably changed in appearance beyond the actual effects of shrinking, that the shrinking agent should not exert, even to a relatively low degree, an actual solvent action. At the same time methylene chloride has, when used alone, a very powerful shrinking action, such that a greater degree of shrinkage may be produced by its action than is desirable for processes involving shrinkage such as are set out in U. S. Patent No. 2,070,583. It is therefore usually necessary to reduce the shrinking power of methylene chloride by dilution. Here again difficulties may arise in the choice of diluent since, as already explained, many compounds which might be expected to reduce the shrinking power of methylene chloride by dilution, form therewith mixtures which actually dissolve the cellulose derivative. However, a number of suitable diluents are named in U. S. Patent No. 2,070,583 including benzene, toluene, xylene, petrol ether, carbon tetrachloride and other halogenated hydrocarbons which are, for practical purposes, inert towards the cellulose derivative. The proportion of such diluents in the mixture may be 30 to 40%. It is also stated that in some cases methylene chloride may be mixed with a less powerful latent solvent, dichloroethylene being specified, but in such cases the concentration of the methylene chloride is very much lower, i. e. 20 to 30% instead of 60-70%.

We have now found that a most useful shrinking agent, which may be applied quite generally to cellulose derivative materials, e. g. cellulose acetate materials, is provided by a mixture of methylene chloride with ethylene dichloride, in which the proportion of methylene chloride preferably exceeds 50% of the whole. This is of course a most unexpected discovery in view of the fact that ethylene dichloride is itself a latent solvent for cellulose derivatives, so that a mixture of methylene chloride and ethylene dichloride would on all the evidence be expected to have at most a very limited value and application, even if the proportion of methylene chloride were well below 50%.

The actual proportions of methylene chloride and ethylene dichloride in the mixture depend to some extent on the particular cellulose derivative which is being treated, the effect desired, and the conditions under which the treatment is carried out. Generally, mixtures containing between about 55 and 70% of methylene chloride, and especially mixtures containing between about 60 and 66%, may be used; thus mixtures containing between about 62 and 65% of methylene chloride, when applied at room temperatures, i. e. between about 15° and 25° C., to materials having a basis of cellulose acetate or other lower fatty acid ester of cellulose, cause a satisfactory degree of shrinkage in a conveniently short time. For example, a mixture containing between about 62 and 65% of methylene chloride may be applied to cellulose acetate materials for less than 60 seconds at a temperature of about 18 to 20° C. Generally the higher the temperature and the greater the proportion of methylene chloride in the mixture, the shorter is the time for which the mixture must act on the cellulose derivative material to produce a given degree of shrinkage, or to exert its maximum shrinking effect.

The treatment with the shrinking agent may with particular advantage be applied to dry-spun cellulose derivative filaments, threads, yarns and the like, especially materials having a basis of cellulose acetate, which have been stretched so as to increase their tenacity, and to fabrics made from such filaments, threads and yarns, and to wet-spun cellulose derivative filaments, threads, yarns and the like, and also to fabrics made therefrom, with a view to improving their extension. These materials may be treated in any suitable form. For example, filaments, threads or yarns may be treated in hank form or may be passed continuously through a bath or spray or over wicks, pads or the like, whereby the mixture of methylene chloride and ethylene dichloride is applied to the materials, and after a suitable interval the materials may be substantially freed from the mixture, for example by washing with an organic solvent which does not deleteriously affect them. Fabrics and the like may for example be passed continuously through a bath containing the mixture of methylene chloride and ethylene dichloride or may be sprayed therewith or treated by padding or other methods. If desired the degree of shrinkage may be further controlled by holding the materials under tension while they are in contact with the shrinking agent. For example, filaments, threads, yarns and the like may be fed continuously through or otherwise in contact with the shrinking agent by means of sets of feed or nip rollers, the relative speeds of which are adjusted to permit the desired degree of shrinkage. Fabrics may also be fed continuously by means of rollers or may for example be held on stenter frames or the like.

In another method of carrying out the process, filaments, threads, yarns and the like may be loosely wound on bobbins or swifts or may be in the form of cakes made by means of a centrifugal spinning box or in some other package form. By the use of resilient bobbins, swifts or other supports shrinkage may be permitted while the yarn is in the package form; alternatively the yarn may be wound off from the package and re-wound at a suitably lower winding speed so as to permit the desired amount of shrinkage. Thus, for example, yarn may be unwound from a bobbin or the like, treated with the mixture of methylene chloride and ethylene dichloride, carried through nip rollers, and after a run the length of which depends on the period for which the shrinking agent is to act, it may be washed with a suitable solvent, carried through a second set of nip rollers rotated at a speed appropriate for the desired amount of shrinkage, and finally rewound on any other desired package. Feed rollers may be substituted for the nip rollers described. Other suitable devices may be used in place of the nip or feed rollers; for example a drum winding device driven at a suitable speed may effect the winding and allow shrinkage in a single operation.

In another method of working, filaments, threads, yarns or the like proceeding directly from a dry or wet spinning process or from a stretching process may be treated. Thus when treating stretched yarn the shrinkage may be caused to take place continuously with the stretching of the yarn, preferably after removing any organic stretching assistant which may have been used.

The shrinking process may, if desired, be carried out upon yarns in warp formation and in this case also it may be combined with a stretching process.

Various effects may be produced by a shrinking treatment as above described. For example the extension of filaments, threads, yarns and the like, particularly such materials which have been stretched or prepared by wet spinning methods, may be increased to a substantial degree. Other effects of widely varying character may be produced. For instance, a cellulose acetate yarn or a yarn made of another cellulose ester or a cellulose ether may be associated by twisting, knitting or weaving or any other means with another yarn which is not shrinkable, or which is shrunk to a lower degree, by the mixture of methylene chloride and ethylene dichloride. By these means products resembling to some extent the so-called "slub" yarns may be produced. By weaving a fabric with wefts and/or warps of cellulose derivative alternating with wefts and/or warps of another fibre, the alternation being for example 1:1, 2:2, 2:1 and so forth, pebble, cockle or crepe effects may be produced. In the case of a weft of cellulose derivative alternating with another fibre, for example cotton, the warp may consist wholly of cellulose derivative or wholly of another fibre or partly of cellulose derivative and partly of another fibre.

Brocade and like effects may be produced on knitted, woven or other fabrics by the local application of the mixture of methylene chloride and ethylene dichloride to such fabrics, for example by printing methods.

Further, the new shrinking agent may be utilized to reduce the tendency of knitted fabrics to ladder, of warp knitted fabrics to split and of woven fabrics to slip, the shrinking brought about apparently causing closer packing of the threads thereby reducing the tendency to the above faults. Other uses of the invention include for example the tightening of umbrella fabrics on their frames by producing a suitable shrinkage.

The invention also includes the production of shrinkage effects by means of differential shrinkage between two or more different types of cellulose derivative materials, for example wet and dry-spun yarns or yarns of different esters or ethers or of different ester or ether content. Such differently shrinkable yarns may also be used in conjunction with other fibres.

Of the various fibres which may be used in association with cellulose derivative yarns and which are more or less unshrinkable by the mixture of methylene chloride and ethylene dichloride, there may be mentioned natural silk, wool, cotton and regenerated cellulose artificial silk.

Although the invention has been described more particularly in relation to the treatment of textile materials having a basis of cellulose acetate it may also be applied to other cellulose derivative materials, for example esters of cellulose, e. g. cellulose formate, propionate, butyrate, nitro-acetate, acetate-propionate, acetate-butyrate and acetate-stearate, cellulose ethers such as methyl, ethyl and benzyl cellulose and mixed ether-esters of cellulose.

The following examples illustrate without in any way limiting the invention:

Example I

A dry-spun cellulose acetate yarn which has been stretched in wet steam at about 135° C. to ten times its original length is immersed, in hank form, in a shrinking bath containing 64% of methylene chloride and 36% of ethylene dichloride, maintained at a temperature of 19° C. After 20 seconds the yarn is removed from the bath, rapidly washed and dried.

Example II

A dry-spun cellulose acetate yarn which has been stretched as described in Example I is passed continuously through a shrinking bath containing 64% of methylene chloride and 36% of ethylene dichloride, maintained at a temperature of 19° C. The rate of travel of the yarn is such that it remains in the bath for 20 seconds. On leaving the bath the yarn is thoroughly washed, dried and rewound, the speed at which the rewinding is carried out being adjusted so that the yarn is never under sufficient tension to restrict substantially the amount of shrinkage.

In either of these examples wet-spun cellulose acetate yarn or unstretched dry-spun cellulose acetate yarn may be treated in the same manner as the stretched dry-spun yarn.

Having described my invention, what I desire to secure by Letters Patent is:

1. Process for producing shrinkage effects on textile materials having a basis of a lower aliphatic acid ester of cellulose, which comprises applying to the materials, under conditions such that the materials are free to shrink, a mixture containing 55-70% of methylene chloride and 45-30% of ethylene dichloride.

2. Process for producing shrinkage effects on textile materials having a basis of cellulose acetate, which comprises applying to the materials, under conditions such that the materials are free to shrink, a mixture containing 55-70% of methylene chloride and 45-30% of ethylene dichloride.

3. Process for producing shrinkage effects on textile materials having a basis of cellulose acetate which comprises applying to the materials at a temperature of 15°-25° C., under conditions such that the materials are free to shrink, a mixture containing 62-65% of methylene chloride and 38-35% of ethylene dichloride.

4. Process for shrinking and improving the extension of textile materials having a basis of a lower aliphatic acid ester of cellulose and produced by dry spinning followed by stretching, which comprises applying to the materials for 20 seconds, under conditions such that the materials are free to shrink, a mixture containing 55-70% of methylene chloride and 45-30% of ethylene dichloride.

5. Process for shrinking and improving the extension of textile materials having a basis of a lower aliphatic acid ester of cellulose and produced by wet spinning, which comprises applying to the materials for 20 seconds, under conditions such that the materials are free to shrink, a mixture containing 55-70% of methylene chloride and 45-30% of ethylene dichloride.

6. Process for shrinking and improving the extension of textile materials having a basis of cellulose acetate and produced by dry spinning followed by stretching, which comprises applying to the materials for 20 seconds at a temperature of 15-25° C., under conditions such that the materials are free to shrink, a mixture containing 62-65% of methylene chloride and 38-35% of ethylene dichloride.

7. Process for shrinking and improving the extension of textile materials having a basis of cellulose acetate and produced by wet spinning, which comprises applying to the materials for 20 seconds at a temperature of 15-25° C., under conditions such that the materials are free to shrink, a mixture containing 62-65% of methylene chloride and 38-35% of ethylene dichloride.

FRANK BRENTNALL HILL.